United States Patent [19]

Brouwer et al.

[11] Patent Number: 4,738,347
[45] Date of Patent: Apr. 19, 1988

[54] DIVERTER SHOE AND DIVERTING RAIL

[75] Inventors: Gerald A. Brouwer, Grandville; William J. Campbell, Grand Rapids; Charles W. Saur, Sparta; Bernard H. Woltjer, Jenison, all of Mich.

[73] Assignee: Rapistan Corp., Grand Rapids, Mich.

[21] Appl. No.: 896,802

[22] Filed: Aug. 15, 1986

[51] Int. Cl.⁴ .................................................. B65G 47/46
[52] U.S. Cl. ..................................... 198/372; 198/365; 198/802
[58] Field of Search ............... 198/365, 367, 370, 372, 198/440, 457, 802

[56] References Cited

U.S. PATENT DOCUMENTS

| 3,093,245 | 6/1963 | Worcester et al. | 198/356 X |
| 3,361,247 | 1/1968 | Lauzon et al. | 198/574 X |
| 3,580,379 | 5/1971 | Shuster et al. | 198/401 |
| 3,677,389 | 7/1972 | Benatar | 198/440 X |
| 3,735,867 | 5/1973 | Vanderhoof et al. | 198/367 X |
| 3,770,100 | 11/1973 | McCaul | 198/365 X |
| 3,780,850 | 12/1973 | McSwiggin | 198/362 X |
| 3,986,596 | 10/1976 | Hamilton | 198/442 X |
| 3,987,888 | 10/1976 | Wickam | 198/440 X |

FOREIGN PATENT DOCUMENTS

| 969510 | 6/1975 | Canada | 198/365 |
| 3538875 | 5/1986 | Fed. Rep. of Germany | 198/365 |
| 85757 | 5/1982 | Japan | 198/365 |

Primary Examiner—Stephen J. Novosad
Assistant Examiner—John F. Letchford
Attorney, Agent, or Firm—Price, Heneveld, Cooper, DeWitt & Litton

[57] ABSTRACT

The operating characteristics of a diverter having a driven article conveying surface of parallel tubes on which article diverting shoes are caused to move across progressively because of contract between a depending drive pin on each shoe and a laterally inclined rail beneath the conveying surface by changing the shape of the rail contacting roller on the pin so that a downward force vector is created tending to hold the shoe down. Also, the shoe is supported on three rollers instead of two to prevent the tendency of the shoe to pivot about one tube due to article resistance to lateral movement. The design of the openings in the shoe through which the tubes pass are such that the shoe will not become bound between two tubes which are not entirely straight.

14 Claims, 2 Drawing Sheets

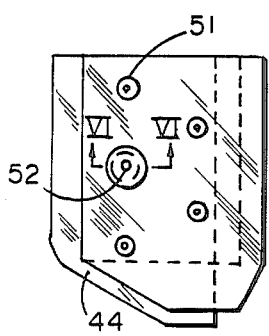
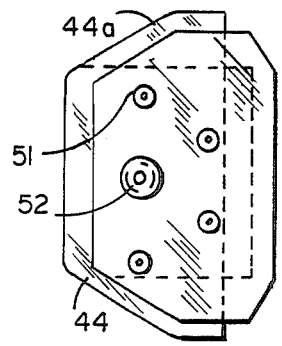
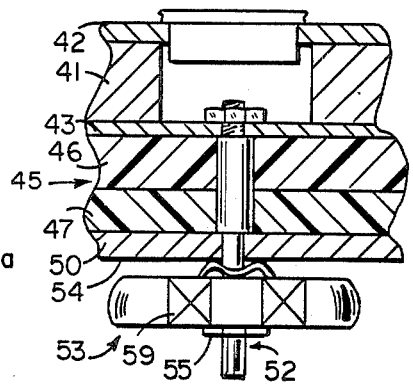
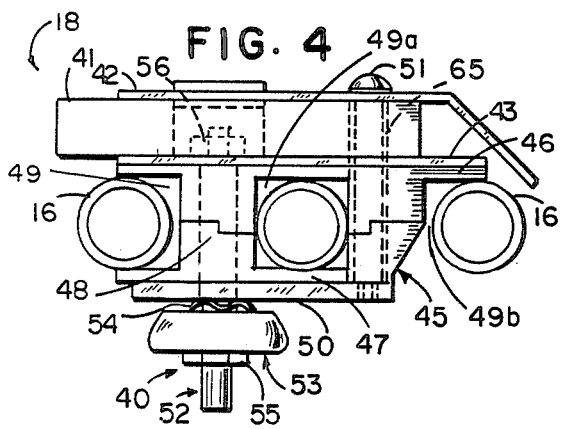
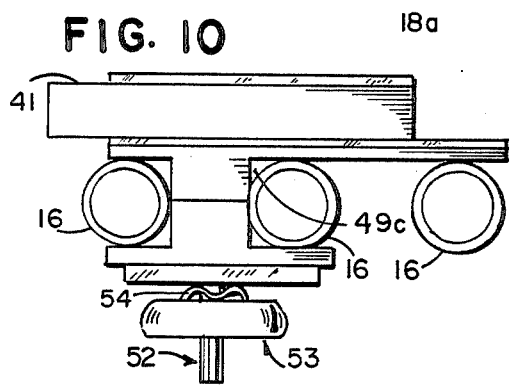
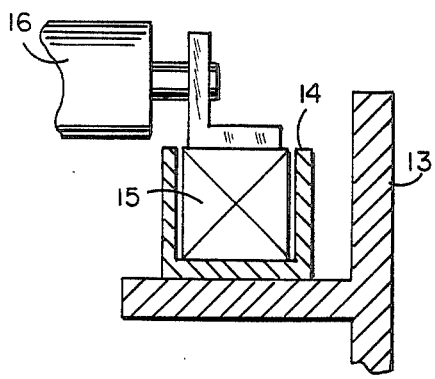

DIVERTER SHOE AND DIVERTING RAIL

FIELD OF THE INVENTION

The invention is an article diverter and more particularly is an article sorter or diverter of the type on which the articles are conveyed on a transport surface consisting of a plurality of transverse tubes which are attached to and moved through an endless loop from which the articles are diverted by means of pushers which slide lengthwise of the tubes to discharge the article.

BACKGROUND OF THE INVENTION

Article diverters and sorters utilizing a moving transport surface consisting of a plurality of parallel tubes have been known for a number of years. Such diverters and/or sorters having pushers mounted on tubes and cooperating with means to cause the pushers, on signal to move transversely across the transport surface and push the articles to one side or off the conveyor have been utilized for a number of years. Exemplary of this type of conveyor are U.S. Pat. No. 3,361,247, issued Jan. 2, 1968 to James N. Lauzon et al., U.S. Pat. No. 3,780,850, issued Dec. 25, 1973 to J. L. McSwiggin and U.S. Pat. No. 3,986,596, issued Oct. 19, 1976 to Dale R. Hamilton. It will be noted that a number of these patents involve sleeves which slide along the tubes and are big enough that the article rests on the sleeve and is thus transported transversely of the conveyor. However, more common is the arrangement disclosed in the Lauzon et al. patent, in which the articles are moved by pushers which project above the surface and are caused to move transversely of the conveyor as the transport surface progresses with one or more of the pushers engaging the article and pushing it to one side of the conveyor or completely off the conveyor surface. What disposal is made of the article so moved depends on the purpose of the equipment. This invention relates to the type of system which discharges the articles laterally from the transport surface.

Several problems have been encountered with these various prior art designs. Among these is the problem of warpage or bending of the tubes which gives them a slight arch along their length, thus, making them rotate somewhat eccentrically. Some of this bending occurs because the pushers twist about their vertical axes forcibly spreading the tubes apart. Such warpage or bending is often the result of the fact that such transport surfaces are wide and because of the nature of the structure, the tubes cannot be supported intermediate their ends without interfering with the lateral travel of the pushers. Such deflection or warpage may also occur as a result of the weight of the articles being transported on the transport surface. Whatever the cause is, the deflection or warpage causes the spacing between adjacent tubes to widened in some areas and significantly narrowed in other areas. To overcome this problem, that portion of the pushers, that is, the neck extending vertically between the tubes has to be made substantially narrower than would be the case if the tubes were all straight and uniform. Thus, the depending neck or leg which extends between the tubes has a loose or sloppy fit with the tubes, permitting the pusher to twist about its vertical axis in response to resistance of the articles on the transport surface to being moved transversely of the surface. Such twisting causes binding, excessive wear, and higher demands on the prime mover driving the transport surface. Further, it may cause improper contact between the pushers and the article.

Another problem which has been encountered in existing equipment of this type is the fact that when the system is used for heavy articles or articles having surfaces with a high coefficient of friction the resistance to being moved lengthwise of the tubes becomes great enough that the pushers are caused to tilt about a transverse axis with the lead or forward end of the pusher rising in response to the resistance of the article. This results in excessive wear and in substantially increased resistance to movement between the tubes and the pusher. In fact the upward force thus created may be sufficient to pivot the tubes supporting the pushers about one end, lifting the tubes and the chain at the other end. In some cases, this results in the guide pin or guide wheel which depends from the pusher and engages the guide rail beneath the transport surface to jump over this rail, thus, rendering the pusher nonfunctional. This, of course, results in a malfunction and significantly impairs the efficiency and dependability of the equipment. The rotational and lifting forces complement each other in creating serious malfunctions of the system.

BRIEF DESCRIPTION OF THE INVENTION

Applicant's invention is addressed to both of these problems. In one aspect of the invention, the length of the pusher is increased from the conventional arrangement in which the pusher is mounted on only two of the tubes to one which permits it to be engaged by three of the tubes. In such an arrangement, the center one of the tubes is utilized as the guide and primary means along which the pusher is moved and the other two tubes, one on each side of the center tube, are used to control pivoting of the pusher lengthwise of the transport surface. In the preferred arrangement, the pusher has a lip or tongue extending over the forward or lead tube, with direction of movement of the transport surface, and has a lip or tongue seating the rear or trailing tube. Thus, any force attempting to pivot or rock the pusher about the main or center tube is positively resisted by the other two tubes without creating a binding situation.

The invention also further limits the tendency to pivot about the axis of the center tube by providing the guide rail which causes the pushers to travel transversely of the transport surface to be inclined downwardly and forwardly or in the direction of movement of the transport surface. This coupled with a guide wheel having an axially curved periphery shifts the point of contact between the guide wheel and the guide rail to a point well above the central plane of the guide wheel, thus, creating a vertical force vector acting in a downward direction so that the wheel and the rail combine to pull the pusher together with the tubes it engages downwardly. Thus, the tendency to lift the tubes and disengage the guide rail is eliminated. Each of these arrangements materially improves the operation of this type of sorter or diverter, eliminating the serious problems which have heretofore been encountered.

BRIEF DESCRIPTION OF THE DRAWINGS

FIG. 3 is an enlarged fragmentary sectional view taken along the plane III—III of FIG. 1;

FIG. 4 is a side elevation view of one of the pushers;

FIG. 5 is a plan view of one of the pushers;

FIG. 6 is an enlarged, fragmentary sectional view taken along the plane VI 13 VI of FIG. 5;

FIG. 9 is a plan view of a modified construction for one of the pushers;

FIG. 10 is a side elevation view of a modified construction for one of the pushers;

FIG. 11 is a fragmentary schematic view of the guide wheel illustrated in FIG. 8; and FIG. 12 is a side elevation view of the pin for the guide wheel.

DESCRIPTION OF THE PREFERRED EMBODIMENT

Figure 1:
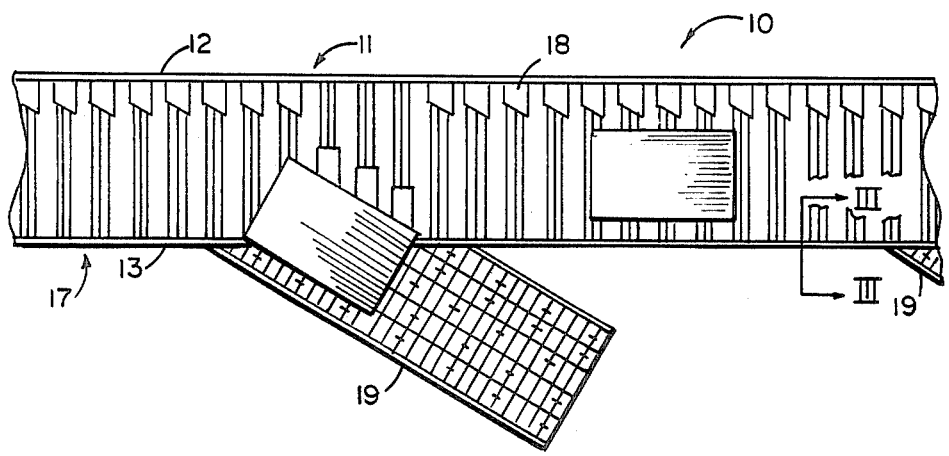
FIG. 1 is a schematic fragmentary plan view of a diverter incorporating this invention.

Referring specifically to FIG. 1, the diverter 10 is illustrated schematically. It has a frame 11, equipped with a pair of side rails 12 and 13 which, as illustrated in FIG. 3, provide support for the chain track 14, chain 15 and the tubular members 16 which form the transport surface of the diverter. The chains 15 and the tubes connected to the chain form an endless loop driven by any suitable means to provide a moving article transport surface 17. Slidably mounted on the tubes 16 are pusher shoes 18. At one or more selected points along the diverter, receiving tracks 19 for diverted articles are provided. These tracks extend away from the primary transport surface of the diverter at a minor angle.

Figure 2:
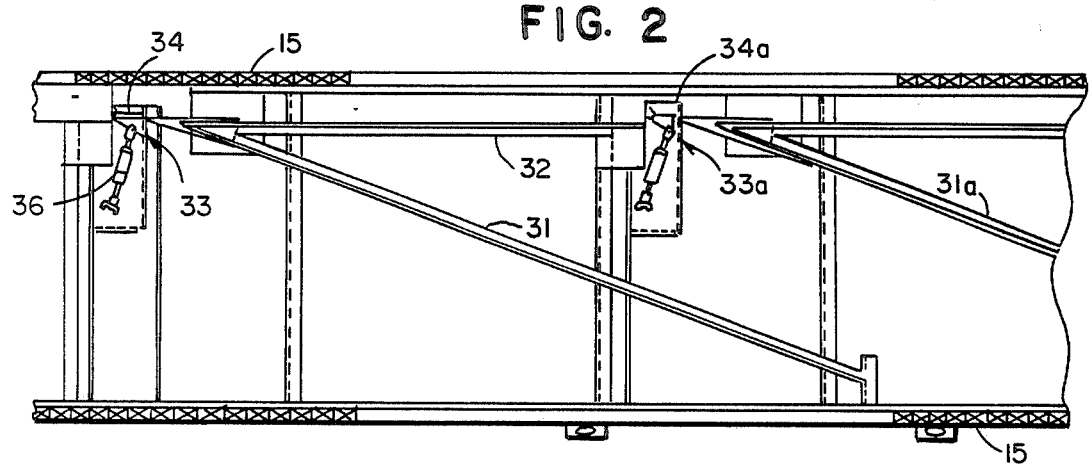
FIG. 2 is a plan view of the frame and track for the diverter illustrated in FIG. 1 with the transport surface forming tubes removed.

As best seen in FIG. 2, beneath the transport surface, the diverter has a primary guideway 30 defined by the guide rail 32 and guide rails 31 extending from the primary guideway to the opposite side of the conveyor at an angle to the main axis of the diverter. One of the guide rails 31 is provided at each point at which articles are to be diverted. Where the guide rail 31 meets the rail 32 a switch 33 is provided having a tongue 34 which can be pivoted to direct the pusher shoes to either remain in the primary guideway 30 or to be diverted into contact with the guide rail 31 and, thus, forced to move transversely of the diverter. The position of the switch tongue is controlled by the pneumatic actuator or cylinder 36. As will be more fully explained subsequently, the switch tongue 34 controls the actuation or nonactuation of the pushers 18. As many of the guide rails 31 and related switches 33 are provided as there are receiving tracks for the articles. In this case, only a second guide rail 31a and switch 33a are illustrated.

The tubes 16 have a substantial span from one side of the diverter to the other. This span cannot be supported between the ends of the tubes because it is necessary to permit the pushers 18 to travel the length of the tubes without interference.

Each of the pushers is relatively short with respect to the length of the tubes. The pushers are mounted on the tubes and are designed to slide along the tubes transversely of the transport surface. Normally, they are, in effect, parked at one end of the tubes as a majority of them are illustrated in FIG. 1. This is their inactive or storage position. Each of the pushers, has a depending actuator means which extends downwardly sufficiently to engage against either the guide rail 32 for the primary guideway or against one of the guide rails 31. Engagement between the guide means 40 and one of the guide rails controls the transverse position of the pusher on the transport surface. Which rail the guide means 40 engages is controlled by the position of the switch tongues 34.

The pushers are more specifically illustrated in FIGS. 4, 5, and 6. Each pusher has an article engaging pad 41 sandwiched between the top plate 42 and an intermediate plate 43. The top and intermediate plates are of metal, preferably steel or aluminum and, in effect, are stiffeners to support the pad 41. The pad is preferably of rubber or a material of similar physical characteristics. Rubber is desirable because it has a degree of resilience which reduces the impact shock resulting from its initial engagement with an article. Rubber also has a relatively high coefficient of friction providing a surface which is effective in positively moving the articles across the transport surface. Particularly is this important at the last part of the transfer when only one pusher maintains article contact and has to complete the article movement. Because the articles must move transversely of the transfer surface as they are being moved by the pushers the pad 41 has an inclined surface 44. If the diverter is designed to divert the pusher in only one direction, it has only one inclined article contacting surface. If, however, the diverter is designed to operate either to the left or the right, the pusher 18a for such a diverter has two inclined surfaces 44 and 44a, as illustrated in FIG. 9.

The intermediate plate 43 is seated on the main body 45 of the pusher. The body 45 consists of an upper portion 46 and a lower portion 47. The two portions have interfitting offsets 48 which prevent the two portions from rotating or otherwise shifting with respect to each other once they have been assembled (FIG. 4). Both the upper portion and the lower portion have recesses which, when the two portions are assembled to form the body, form the channels 49, 49a and 49b for the tubes 16. The pushers are designed to embrace three adjacent tubes but only the center one is surrounded on all four sides by the body 45. In the preferred embodiment, the channel 49a is of a size such that the pusher can slide along the rod with only sufficient clearance to permit the pusher to move without binding between the pusher and the rod. In the preferred embodiment this requires a clearance of about forty thousandths, both horizontally and vertically. The channels 49 and 49b each have vertical faces which maintain a clearance with the sides of the rods 16 seated in these channels. This arrangement prevents binding from occurring as a result of the pusher being trapped between two tubes which maybe slightly curved or are deflected by the loads imposed by the pusher. It will be observed from FIG. 4 that the channel 49 is such that the tube is designed normally to engage the lower face of the channel 49 to prevent the forward end of the pusher from lifting as a result of the force vector created by the articles being pushed transversely of the transport surface. In like manner, it will be observed that the channel 49b is designed to make contact with the top of the tube in that channel. In this manner, the tubes in these two channels act to prevent pivoting of the pusher about the tube in the central channel 49a as a result of contact with the articles being diverted. In utilizing a three-tube mount, the conventional linking of two tubes to pass around the end sprockets for the transport surface as a unit is retained. The third tube, however, is separate and the chains between the unitized tube pair and the third tube is free to flex. Thus, it is necessary that the pusher have no flange extending under the third or lead tube which would interfere with this flexing.

The body 45 is preferably made from a rigid plastic material which provides a low friction surface to facilitate the transverse movement of the pushers. A suitable material for the body is high molecular weight polyethylene. While body 45 can be molded, it may also be machined from a slab of the material.

The bottom of the pusher is provided with a plate 50 of suitable material such as steel or aluminum. Bolt-like fasteners 51 extending vertically through the pushers hold the assembled parts together. The fasteners each have a threaded end of reduced diameter to create a shoulder seating against the inner face of the lower plate 50. The fasteners 51 are each surrounded by a spacer 65. The length of the spacers 65 is such as to permit the fasteners to firmly hold together the plates 42, 43 and 50 and the pad 41 and body 45 without compressing these body components to cause the material of the pad and body to migrate sideways.

Extending down through the assembly is spindle 52 on the lower end of which is mounted the guide wheel 53. It will be noted from FIG. 6 that the upper end of the spindle 52 is recessed into the pusher and is secured by a nut 56. The spindle also has a shoulder 57 (FIG. 12) which seats against the bottom surface of the intermediate plate 43. The spindle also has an lower portion 58 which seats against the inner race of the bearing 59 for the guide wheel 53. The portion 58 forms a shoulder 60. At the lower end of the enlarged portion 58 the spindle has a flange 61 of hex cross section to receive a wrench.

The guide wheel is mounted on the spindle 52 and seats against the flange 61. It is held between the flange and a wave washer 54 which bears against the inner race of the guide wheel to prevent its rotation. It will be noted that the only compression force exerted by the pin on the body of the pusher is that created by the wave washer. Below the flange 61 the spindle has a projection 62 for engaging the switch tongue.

Figure 7:
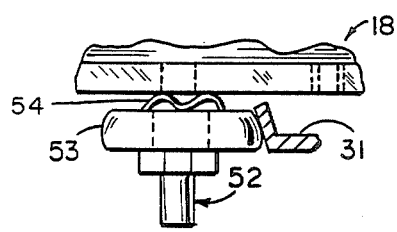
FIG. 7 is a fragmentary view of the guide wheel and guide rail for the pusher.
Figure 8:
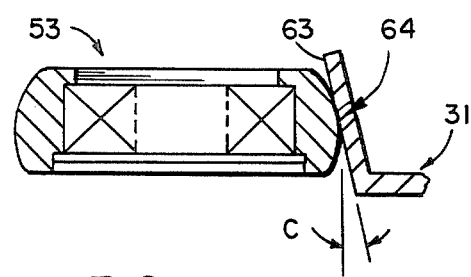
FIG. 8 is an enlarged central sectional view of the guide wheel and guide rail.

Referring now to FIGS. 7, 8 and 11, it will be noted that the guide wheel has a specially shaped peripheral surface which constitutes an axially extending segment of a circle, which is generated about a point 68 (see Radius A) which is offset radially from the central axis of the wheel and offset below a plane B which is midway between the upper and lower faces of the wheel (FIG. 11). Thus, the point of maximum diameter of the periphery of the wheel is offset below plane B, thus, creating an outer periphery which has a significantly smaller diameter at the top of the wheel than at the bottom. This design for the periphery of the wheel cooperates with the guide rail 31 which is shaped such that its wheel engaging face 63 is inclined upwardly and toward the wheel. This, creates a point of tangency 64 as seen in FIG. 8 between the rail and the wheel which is substantially above the central plane of the wheel identified as plane B in FIG. 11. Preferably, the inclination of the face 63 is approximately 15° to the axis of the wheel (see Angle C). This arrangement creates a vector of force operating downwardly, thus, countering the forces tending to lift the forward end of the pusher together with two of the tubes due to the resistance of the articles to transverse movement across the transport surface. In some cases, such as when the divert angle, that is, the inclination of the guide or divert rail 31 to the guide rail 32 is 20° or less this arrangement can be used with a two tube mounting to prevent lifting of the pushers. However, when the divert angle exceeds 20° and especially when it is 30° or more the three tube mounting illustrated in FIGS. 4 and 10 must be used.

FIG. 10 illustrates a modification of the construction for the pusher. In this case, the construction of the main body is such that that channel 49c, which corresponds to the channel 49a in the preferred embodiment illustrated in FIG. 4, has only three faces and the channel 49b is eliminated with the body merely extending over the top of the third rod. The channel 49 remains the same as in the preferred embodiment illustrated in FIG. 4. The basic function of the pusher 18a remains the same as that illustrated in FIG. 4 but the cost of manufacturing the pusher is reduced inasmuch as less material is used.

The operation of the diverter which determines whether the individual articles are to be diverted, and if diverted, where is basically conventional. For example, one method of controlling diversion is to have each of the articles equipped with readable indicia which is read ahead of each of the switches 33. If the article is to be diverted at that particular switch, the actuating cylinder 36 is operated to pivot the tongue 34 such that the pin 62 of the spindle, on engaging the tongue 34, is pushed transversely, diverting the pusher from the primary guideway 30 to cause the wheel 53 to engage and follow the guide rail 31. The movement of the article transfer surface 17 then automatically starts transverse movement of enough of the pushers 18 to effectively move the article across the surface as the transfer surface continues to progress lengthwise of the diverter. The system includes a device for measuring the length of the article, thus, determining the number of pushers to be activated. Once the appropriate number of pushers have been activated, a signal is generated to cause the cylinder 35 to restore the switch plate 34 to its normal position allowing the next following pushers to remain in storage mode. At one end of the diverter, rails (not illustrated) angled oppositely to guide rails 31 and 31a are provided to return the pushers to their normal storage position. All of this operating mechanism is conventional and well-known in the field of diverters and conveying technology. There are various other ways of controlling which articles are to be diverted and where. Exemplary of another such system is one in which each article is identified in a computer memory and its progress automatically tracked by the computer until it arrives at the proper diverter switch which is then operated by the computer. This facet of the diverter is not part of this invention but is described to provide environmental background for the invention.

The invention provides solutions to two problems heretofore encountered with diverters of this type.

First, it prevents the pushers from rising as a result of article resistance to lateral movement. It has been the experience with diverters of this type that the upwardly acting force can be great enough to cause the pushers to pivot the rods upwardly about one end. This has resulted in the guide wheel jumping the guide rail and becoming inoperative. The invention provides a counter force by virtue of the angular engagement between the guide wheel and the guide rail. Secondly, the three tube mount for the pushers positively keeps them parallel with the transport surface, countering the tendency to pivot about one of the tubes due to article movement resistance.

By engaging the sides of only one tube, that being the center one, the pusher is capable of following that tube, even though the tube bent or deflected without causing a bind by trapping the pusher between two tubes. This also permits the channel for the center tube to fit closely about the tube. This makes it possible to limit rotation of the pusher about its vertical axis which is important to maintenance of contact with the article across the full width of the contact face of the pad 41.

Having described the preferred embodiment of the invention together with modifications thereof, it will be recognized that other modifications of the invention can be made without departing from the principles of the invention. Such modifications are to be considered as included in the hereinafter appended claims unless these claims by their language expressly state otherwise.

We claim:

1. In a diverter of the type having an article transport surface formed of a plurality of parallel transverse tubes flexibly connected together at their opposite ends to form a surface in the form of an endless loop and means for driving said surface lengthwise of the diverter and a plurality of article engaging pusher shoes mounted on said tubes for sliding movement lengthwise thereof, each of said shoes being seated on three of said tubes and having an article engaging pad portion above said surface, said pad portion having a leading edge inclined to the longituidnal axis of the diverter for urging articles to move transversely of said transport surface, said shoe having a rigid body member beneath said pad, said body member having a portion extending downwardly between said tubes and forming tube receiving channels, an element on the bottom of the downwardly extending portion of said body member extending beneath adjacent ones of said tubes, a portion of said body member extending away from the direction of travel of said transport surface and over a third tube and cooperating with said element for preventing said shoe from pivoting upwardly toward its front end as a result of article resistance to transverse movement on said transport surface.

2. In a diverter of the type having an article transport surface formed of a plurality of parallel transverse tubes joined together at both ends by flexible drive elements to form an endless loop and means for driving said surface lengthwise of the diverter and a plurality of article engaging pusher shoes mounted on said tubes for sliding movement lengthwise thereof, each of said shoes having a leading edge inclined transversely of said transport surface for urging articles on the surface to move transversely thereof; each of said shoes having a spindle extending below said tubes; a guide wheel rotatably mounted on the lower end of said spindle; a guide rail beneath said tubes extending at an angle transversely of said transport surface and in a plane to be engaged by said guide wheel, the improvement in said diverter comprising: the surface of said guide rail facing upstream of the direction of movement of said transport surface being inclined downwardly and away from said guide wheel whereby a downward vector of force is created resisting upward movement of the shoe and guide wheel resulting from resistance to lateral movement of articles engaged by said pusher.

3. A diverter as described in claim 2 wherein the circumferential surface of the guide wheel is axially curved whereby the point of tangency between the guide wheel and the guide rail is above a plane midway between the top and bottom of the guide wheel and at a point that is of a radius less than the maximum radius of said guide wheel.

4. A diverter as described in claim 2 wherein the circumferential surface of the guide wheel is axially curved such that the radius of the surface is less at the upper edge of the wheel than at the lower edge thereof whereby contact between said surface and the guide rail is offset upwardly from a plane midway between the upper and lower surfaces of the wheel.

5. A diverter as described in claim 3 wherein the circumferential surface of the wheel is shaped in an axial direction on a radius having its point of generation of a circle spaoed radially outwardly from the central axis of the wheel and offset downwardly from the vertical center of the wheel whereby the point of maximum radius of said surface is below the vertical midpoint between the upper and lower surfaces of said wheel.

6. A diverter as described in claim 4 wherein the point of tangency between the wheel and the guide rail is in a plane inclined approximately 15° to the axis of the wheel.

7. In a diverter of the type having an article transport surface formed of a plurality of parallel transverse tubes flexibly joined together at both ends by flexible drive element to form a surface in the form of an endless loop and means for driving said surfaces lenghtwise of the diverter and a plurality of article engaging pusher shoes mounted on said tubes for sliding movement lengthwise thereof, each of said shoes having a pad and a base, said pad mounted to the top of said base and being located above the plane of said surface, said base having an upper portion and a lower portion, each of said portions having transverse recesses, said recesses when said portions are joined together forming three transverse tube receiving channels each for receiving one of said tubes, one at each end of said base and one approximately at the center of said base, the center channel forming a close fitting guide about the center one of said tubes, the end channels having oppositely facing vertical surfaces and each having at least one horizontal tube engaging surface to limit rotational movement of said shoe about the axis of the tube in said center channel.

8. The diverter described in claim 7 wherein the horizontal surface of the channel at the forward end in the direction of movement of the transport surface extends above the adjacent tube and the horizontal surface of the channel at the opposite end of said shoe extends below the adjacent tube.

9. The diverter desribed in claim 7 wherein each of vertical surfaces of the end channels is so positioned as to at all times provide clearance between it and the adjacent tube whereby the center tube alone limits rotational movement of said shoe about a vertical axis.

10. The diverter described in claim 7 wherein said central channel is square in cross section.

11. An article engaging and diverting shoe adapted for sliding movmenet transversely of an article transport surface formed of a plurality of parallel tubular members, said shoe having an article engaging upper portion above said members and a lower portion having forward, rearward and central transverse channels, each of a size to slidably receive therein one of said members; said central channel slidably surrounding one of said tubular members, said lower portion having a pair of horizontally extending flanges, one forming the upper surface of each of said forward and rearward channels to prevent rotary movement of said shoe around the tubular member in said central channel due to article resistance to movement over said transport surface.

12. An article engaging and diverting shoe as described in claim 11 wherein a shaft depends vertically from the lower face of said shoe, a wheel rotatably mounted on said shaft for engaging a stationary surface extending beneath and obliquely transverse of said transport surface to urge said shoe lengthwise of the tubular members.

13. An article engaging and diverting shoe as described in claim 12 wherein the circumferential surface of the wheel is shaped in an axial direction on a radius having its point of generation on a circle spaced radially outwardly from the central axis of the wheel and offset downwardly from the vertical center of the wheel whereby the point of maximum radius of said surface is below the vertical midpoint between the upper and lower surfaces of said wheel.

14. An article engaging and diverting shoe as described in claim 12 wherein the circumferential surface of the wheel is shaped in an axial direction on a radius having its point of generation on a circle spaced radially outwardly from the central axis of the wheel and offset downwardly from the vertical center of the wheel whereby the point of maximum radius of said surface is below the vertical midpoint between the upper and lower surfaces of said wheel; said stationary surface being inclined toward said wheel at a minor angle to provide a point of contact with said wheel adjacent the upper edge of said wheel for creating a force vector acting downwardly on said shoe.

* * * * *

UNITED STATES PATENT AND TRADEMARK OFFICE
CERTIFICATE OF CORRECTION

PATENT NO. : 4,738,347  
DATED : April 19, 1988  
INVENTOR(S) : Gerald A. Brouwer et al.

Page 1 of 2

It is certified that error appears in the above-identified patent and that said Letters Patent is hereby corrected as shown below:

Title page:

In the Abstract, line 4:
    "contract" should be --contact--
In the Abstract, line 13:
    "are" should be --is--
Column 1, line 57:
    "widened" should be --widen--
Column 1, line 57:
    "narrowed" should be --narrow--
Column 2, line 59:
    Delete "the" (second occurrence)
Column 3, line 6:
    "VI 13 VI" should be --VI-VI--
Column 5, line 1:
    "is" (first occurrence) should be --are--
Column 5, line 28:
    After "an" insert --enlarged--
Column 7, line 26:
    "longituidnal" should be --longitudinal--
Column 8, line 11:
    "spaoed" should be --spaced--
Column 8, line 24:
    "lenghtwise" should be --lengthwise--

UNITED STATES PATENT AND TRADEMARK OFFICE
CERTIFICATE OF CORRECTION

PATENT NO. : 4,738,347

DATED : April 19, 1988

INVENTOR(S) : Gerald A. Brouwer et al.

It is certified that error appears in the above-identified patent and that said Letters Patent is hereby corrected as shown below:

Column 8, line 47:
    "desribed" should be --described--

Signed and Sealed this

Twenty-ninth Day of November, 1988

*Attest:*

DONALD J. QUIGG

*Attesting Officer*    *Commissioner of Patents and Trademarks*